US005098454A

United States Patent [19]

[11] Patent Number: 5,098,454

Carpentier et al.

[45] Date of Patent: Mar. 24, 1992

[54] FILTERING CARTRIDGE, OBTAINED BY WET PROCESS, FOR THE FILTRATION OF GASES, PARTICULARLY HOT AND/OR RADIO-ACTIVE AND/OR CORROSIVE GASES

[75] Inventors: Serge Carpentier, Villecresnes; Christian de Tassigny, Sassenage, both of France

[73] Assignee: Societe Generale Pour les Techniques Nouvelles S.G.N., Saint Quentin en Yvelines, France

[21] Appl. No.: 508,660

[22] Filed: Apr. 10, 1990

[30] Foreign Application Priority Data

Apr. 10, 1989 [FR] France ................ 89 04690

[51] Int. Cl.[5] ................ B01D 39/20

[52] U.S. Cl. ................ 55/523; 55/527; 55/DIG. 9

[58] Field of Search ................ 55/378, 523, 524, 527, 55/DIG. 9

[56] References Cited

U.S. PATENT DOCUMENTS 4,221,770 9/1980 Chapman ................ 55/523 X
4,286,977 9/1981 Klein ................ 55/524
4,307,198 12/1981 Oda et al. ................ 55/523 X
4,342,574 8/1982 Fetzer ................ 55/523 X
4,364,760 12/1982 Higuchi et al. ................ 55/523
4,495,030 1/1985 Giglia ................ 55/527 X
4,500,328 2/1985 Brassell et al. ................ 55/97
4,652,286 3/1987 Kusuda et al. ................ 55/523
4,710,520 12/1987 Klein ................ 55/527 X
4,713,285 12/1987 Klein ................ 55/527 X
4,735,638 4/1988 Ciliberti et al. ................ 55/523 X
4,765,915 8/1988 Diehl ................ 55/527 X
4,810,273 3/1989 Komoda ................ 55/523 X
4,869,944 9/1989 Harada et al. ................ 55/523 X
4,894,070 1/1990 Keidel et al. ................ 55/523 X
4,946,487 8/1990 Butkus ................ 55/523

FOREIGN PATENT DOCUMENTS 1503631 10/1967 France .
2556608 6/1985 France .

*Primary Examiner*—Robert Spitzer
*Attorney, Agent, or Firm*—Dennison, Meserole, Pollack & Scheiner

[57] ABSTRACT

A filtering cartridge, without asbestos, for the filtration of gases, especially hot and/or radio-active and/or corrosive gases. The cartridge comprises a substantially cylindrical, hollow body, closed at one of its ends and open at the other end, containing at least 50% by weight of alumina and/or zirconia. The body is obtained by molding in vacuo of a slip consisting essentially of fibers of alumina and/or zirconia having a diameter less than 20 μm and length less than 25 mm, colloidal silica, at least one organic binding agent, at least one deflocculant, optionally, other fibers, and optionally sodium, drying the slip and heat treating the dried slip at a temperature sufficient to volatilize the organic binding agent and deflocculant.

10 Claims, 1 Drawing Sheet

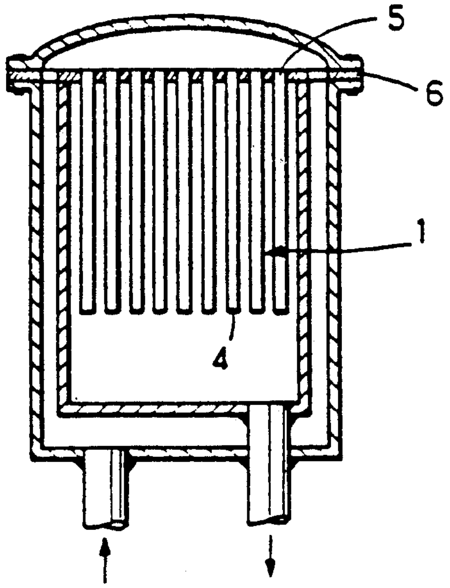
FIG. 1
PRIOR ART
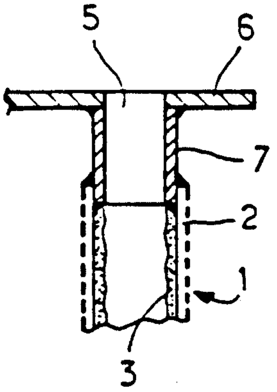
FIG. 2
PRIOR ART
FIG. 3
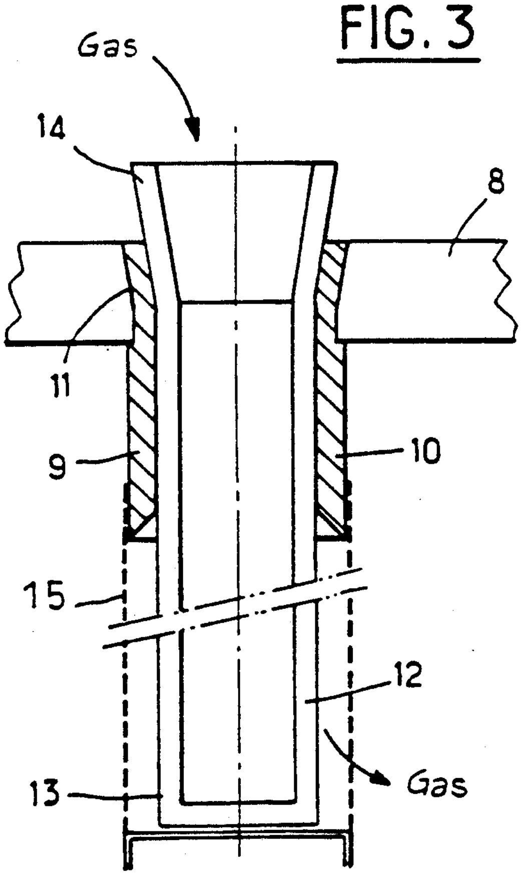

FILTERING CARTRIDGE, OBTAINED BY WET PROCESS, FOR THE FILTRATION OF GASES, PARTICULARLY HOT AND/OR RADIO-ACTIVE AND/OR CORROSIVE GASES

BACKGROUND OF THE INVENTION

The present invention relates to a filtering cartridge for filtering gases, particularly hot and/or radioactive and/or corrosive gases. Such cartridges are particularly useful in installations for the incineration of nuclear waste which produce hot radioactive gases (the temperature of combustion being able to attain 1200° C., the gases are generally at from 600° to 1000° C.). The gases are laden with solid radioactive particles (for example plutonium), carbon black and corrosive vapours ($Cl_2$, HCl, . . . ), in a more or less large quantity depending on the nature of the waste burnt.

In order to purify these gases before rejecting them into the atmosphere, two barriers of filters are disposed in series: the first is constituted by filtering candles which must stop at least 99% of the particles of diameter of the order of 1 μm, and the second is a filter of very high efficiency (V.H.E.) which stops more than 99% of the particles of diameter greater than 0.3 μm. The duplicate arrangement of the barriers makes it possible to increase the life duration of the filter (V.H.E.) which is a very expensive device. The cartridges of the invention are perfectly suitable for the first of these barriers.

Such a filtering barrier with filtering candles is described in French Patent No. 1 503 631; it is schematically shown in FIGS. 1 and 2.

The filtering candles 1 are constituted by a supporting cylinder 2 and a filtering cartridge 3.

The supporting cylinder 2 is porous so as to allow the gases to pass through its walls; it is constituted for example by a wound metallic cloth of which the ends are welded. One of the ends 4 of the cylinder is closed, the other, open, end 5 comprises means for connecting the candle to a plate 6. These means are for example a sleeve 7 fixed to the cylinder and to the plate; in this case, the plate with all its candles is removed for replacement of said candles.

The filtering cartridge 3 is constituted by a felt of defibrated asbestos fibers mixed with previously calcined asbestos. These fibers ensure filtration. In order to limit shrinkage thereof when hot, they may be mixed with fibers of vitreous silica, microquartz, mullite, kaolin, . . . . The fibers of the filtering cartridge 3 are deposited on the support 2 by gaseous entrainment.

In French Patent No. 2 556 608, a candle is individually replaced, the means for connection thereof with the plate being constituted by a flange fixed on the end 5 and simply abutting on the plate.

The candles with asbestos fibers are entirely satisfactory from the standpoints of filtration and cost. However, at the present time, the administrative authorities in certain countries are limiting, and even prohibiting, the use of asbestos.

It was therefore necessary to find a substitute material:

efficient against dust (99% for dust of about 1 μm) for reasonable thicknesses;

with slow speed of clogging-up;

resistant to thermal shocks and chemical aggressivity;

of moderate price.

Furthermore, ceramic candles were voluntarily set aside, since they are too expensive and their speeds of clogging-up are still too rapid.

U.S. Pat. No. 4,500,328 describes a composite material based on refractory ceramic fibers prepared by wet process and used for the filtration of hot gases, particularly incinerator gases.

According to this Patent, said material may be obtained in two different manners.

In a first process of preparation, a very dilute aqueous solution (solid/water total <1% by weight) of refractory fibers (of diameter <12 μm, such as fibers of zirconia , alumina, silica . . . ) and of organic binding agent (phenolic resin, starch . . . at the rate of 25 to 100% by weight of the fibers) is deposited on a perforated mould placed in vacuo. The whole is stoved, dried then demoulded.

The structure obtained is taken to a temperature of 1350° C. for several hours and in an inert atmosphere, in order to pyrolyze the organic binding agent.

The composite material obtained is composed of refractory fibers connected together by carbon which comes from decomposition in an inert atmosphere of the binding agent. In the presence of oxygen, the carbon would be converted into gaseous $CO_2$, hence the necessity of the inert atmosphere.

In a second process of preparation, a very dilute aqueous solution of the refractory fibers alone is deposited on a perforated mould placed in vacuo. After this operation, a solution of nitrate of zirconium or of yttrium is passed through. The whole is dried then is subjected to a conventional sintering.

The composite material obtained is composed of refractory fibers connected together during sintering by the fibers softening. The sintering temperatures are high: 1700° C. for silica and higher than 1700° C. for the other materials (zircon, alumina, . . . ).

The nitrates of zirconium or of yttrium added are stabilizers: they avoid the formation of eutectics which would lower the melting temperature of the material and would consequently be detrimental to correct sintering. This is a conventional use of stabilizers.

The filters obtained according to U.S. Pat. No. 4,500,328 are constituted by the filtering material in the form of a solid cylinder of small dimensions (diameter 19 mm, height 13 mm which also constitutes the filtering thickness) placed in a metallic support substantially of the same dimensions and provided with holes for the passage of the gases.

SUMMARY OF THE INVENTION

According to the invention, it is proposed to prepare filtering candles adapted to be used in the filtering barriers described hereinbefore, i.e. hollow candles, of a relative length. By way of indication, it is specified that said candles may present, particularly for use in a device for incinerating nuclear materials, the following dimensions:

diameter: 25 mm height: 850 mm filtering thickness: about 5 to 10 mm.

It is not at all obvious that the processes described in U.S. Pat. No. 4,500,328 allow efficient candles presenting such a geometry to be prepared.

Furthermore, the first process of said U.S. Pat. No. 4,500,328 leads to a material laden with carbon, which, borne in an incinerating installation delivering sufficiently hot and oxidizing gases, would inevitably degrade, releasing $CO_2$ and consequently losing its cohesion. Moreover, the second process of said U.S. Pat. No. 4,500,328 necessitates a sintering, i.e. a long heat treatment at high temperature.

The inventors have sought a product presenting the required qualities (mechanical strength, resistance to corrosion, aptitude to filtration according to the characteristics required) which is prepared in the most simple manner.

According to the invention, the filtering cartridge useful in particular for the filtration of hot and/or radioactive and/or corrosive gases, is composed of a substantially cylindrical, hollow body, closed at one of its ends and open on the other end, containing at least 50% by weight of alumina and/or zirconia and possibly being provided with means for supporting it on a plate; said body being obtained by moulding in vacuo of a slip comprising fibers of alumina and/or zirconia whose diameter is less than 20 μm and length less than 25 mm, colloidal silica, at least one organic binding agent and at least one deflocculant, then drying and heat treatment at a sufficient temperature to volatize the or each organic binding agent and the or each deflocculant.

In this so-called wet process, a slip is firstly made, i.e. a mixture of the constituents in aqueous medium.

The fibers are selected for their dimensions and nature in order to form a filtering felt. The felt is a tangle of fibers with paths for passage of the gases, distributed at random and whose section is not regular.

The fibers have a length less than 25 mm (preferably from 10 to 15 mm) and a diameter smaller than 20 μm (preferably from 1 to 10 μm, and advantageously a mean value of 3 μm).

The majority of the fibers are necessarily constituted by zirconia and/or alumina; other fibers may be present (fibers laden with silica such as glass fibers, silica fibers) provided that they are compatible with the other constituents and with the application (no meltable fibers for the treatment of gas at temperatures higher than the melting point of these fibers).

In any case, the cartridge obtained after heat treatment must be constituted by at least 50% by weight of alumina and/or zircon.

It preferably contains at least 85% by weight of alumina and/or zirconia. With the alumina fibers, an aluminous product (rather than an aluminosilicate) is obtained, more refractory and more resistant to acids (such as chlorinated products).

Generally, the fibers represent about 1% by weight of the slip, but their quantity is more precisely determined by the man skilled in the art to obtain the cartridge of desired composition.

Colloidal silica (marketed for example under the Trademark LUDOX) is present, according to the invention, in the slip. The slip preferably contains 3 to 12% (by weight) of colloidal silica.

The colloidal silica performs several functions.

Firstly, it is a cold binding agent which makes it possible to increase the viscosity of the slip but, especially, to obtain a sufficient mechanical rigidity of the moulded piece to allow demoulding before even drying.

It may also be reasonably thought that the colloidal silica, when it is in the presence of sodium, advantageously added to the slip, constitutes a hot binding agent for the material, due to the formation of an eutectic $Na_2O$ - $2SiO_2$ - $Al_2O_3$ melting at 732° C.

By heating, there is then bonding of the refractory fibers on the eutectic mixture.

Such bonding must not be detrimental to the filtering power of the filter, and so the quantity of sodium possibly present must be small ( <1% by weight of the slip).

A colloidal silica stabilized with sodium is preferably used (Na <0.1%).

Furthermore, when the temperature exceeds 732° C., the molten eutectic becomes enriched with alumina and/or zirconia (coming from the fibers) and depleted in silica. The refractoriness of the bond increases. The filtering power is in that case maintained at high temperatures (750° C. and more).

The slip also contains one or more organic binding agents conventionally employed in the moulding processes to ensure cohesion cold. It is question for example of starch, polyvinyl alcohol or mixtures thereof. The organic binding agent(s) generally represent(s) 5 to 10% by weight of the slip.

A deflocculant is an organic material which has the property of placing in suspension the solid matters in the slips thus avoiding sedimentation of the fibers. Alginates such as agar-agar are generally used.

The slip thus obtained is moulded.

Moulding is preferably effected in the following manner: the slip is deposited around a perforated mould in which a vacuum is created, the mould being immersed in a tank of slip. An excess thickness is moulded, i.e. a layer of slip greater than that necessary is deposited. This excess thickness subsequently allows machining to the dimensions desired for the cartridge.

Other modes of moulding may also be employed.

The mould used is obviously a substantially cylindrical body to form a substantially cylindrical cartridge. One end of the cartridge may be closed after moulding by assembling an added piece.

After moulding, the cartridge is dried; possibly it is demoulded before or after drying thereof.

A remarkable feature of the present invention is that the cartridge obtained after moulding is demouldable, but especially machinable, due to its mechanical rigidity. Machining is then effected to the final dimensions, the material not presenting any significant shrinkage when hot.

Drying is carried out in conventional manner in an oven to eliminate the water.

This is followed by a thermal treatment at a sufficient temperature to ensure decomposition and volatilization of the or each organic binding agent and the or each deflocculant. There therefore remains no trace of these substances in the filtering cartridge obtained after said treatment.

This treatment is advantageously carried out in the filtering installation: the dried, moulded cartridge is positioned on the plate. Passage of sufficiently hot gases ensures the thermal treatment.

In addition, the material may be subjected to baking, but this operation is not compulsory.

The filtering power of the cartridge thus obtained is due to the felt of fibers which traps the particles transported by the gases, and particularly carbon.

The carbon blocked in the filter, found in an oxidizing atmosphere at 900°-1000° C. (filtration of incineration gases) is then taken to a temperature higher than its start-of-combustion temperature. It is then converted into gaseous $CO_2$.

The felt therefore allows combustion of the trapped combustible particles (under the conditions of the application).

The felt also ensures to a large extent the mechanical strength of the cartridge, the points of bonding by the eutectic guaranteeing optimum cohesion.

The cartridge obtained by wet process, moulded and dried according to the invention, is positioned in the following manner:

either the cartridge is placed in a generally cylindrical support, the latter presenting at its open end a means for being supported by the plate. It is also provided, at the level of that end, with a means for closing the free space between the cylinder and the cartridge, so that the gases to be filtered are directed on entering the hollow space of the cartridge.

The supporting cylinder is advantageously constituted by a welded metallic cloth (as described in the prior art) or by a "sock": this is a woven tube closed at one end, preferably being woven with a yarn of alumino-silicate and with the finest possible mesh.

or the cartridge is used as such, in that case adding thereto on its open end a means for being supported by the plate, this means obviously being designed and disposed so that the gases to be filtered are directed solely in the hollow space of the cartridge. This may be a sleeve fitted in the hollow space of the cartridge and with a flange abutting on the plate, the diameter of the recess of the plate being slightly larger than the outer diameter of the cartridge, so as to change it easily.

A shoulder may also be advantageously provided at moulding, at the level of the open end of the cartridge, which will abut on the plate.

BRIEF DESCRIPTION OF THE DRAWINGS

FIG. 1 shows in cross-section a prior art filtering device;

FIG. 2 is an enlargement of a portion of the device shown in FIG. 1;

FIG. 3 is an enlarged cross-sectional view of a filtering device according to the invention.

DESCRIPTION OF THE PREFERRED EMBODIMENTS

FIG. 3 shows an example of positioning of the cartridge. In a tapered recess of the plate 8, a sleeve 9 has been placed, which comprises a cylindrical part 10 opening outside the plate and a tapered part 11 whose surface cooperates exactly with that of the recess.

This sleeve remains constantly in place. A cartridge 12 is introduced into the sleeve, the inner diameter of the part 10 of the sleeve and outer diameter of the cylindrical body of the cartridge are substantially equal, just to allow slide of the cartridge. The latter is closed at its end 13, its other, open, end comprising a tapered part 14 whose outer surface cooperates exactly with the inner surface of part 11 of the sleeve.

It will be observed that a perforated supporting cylinder 15 may very well be added without this arrangement being compulsory.

The choice of assembly of the cartridge depends mainly on its application and its rigidity. The prepared cartridge may present a sufficient mechanical strength to be mounted without supporting cylinder.

When the cartridge is worn, it is possible:

to remove the candle (cartridge+supporting cylinder) and to replace it outside the installation;

to remove the cartridge alone, the supporting cylinder remaining in place, another new cartridge being positioned in situ;

to remove the cartridge with its supporting means in the case of there not being a supporting cylinder, and replacing it with a new cartridge provided with a supporting means;

to break the worn cartridge and to drop it in the bottom of the enclosure of the filtering barrier, the supporting means remaining in place on the plate, the new cartridge being reintroduced in situ on the supporting means (embodiment of FIG. 3 but without supporting cylinder 15).

The worn cartridges, when they are laden with radioelements, are treated as nuclear waste.

The following Examples will show that the efficiency of filtration of such cartridges is equivalent to that of cartridges employing asbestos fibers prepared by dry process.

Cartridges prepared by wet process are preferably produced and used, as:

preparation by moulding is easier to carry out;

the supporting cylinder which is expensive and which rapidly corrodes when it is made of metal, may be dispensed with;

replacement of the worn cartridges is simplified: it suffices to withdraw or break the worn cartridge and to replace it with another manufactured outside the installation.

EXAMPLE 1

A cartridge is obtained from alumina fibers ground to have an average diameter of 3 μm and an average length of 10–15 mm, laden with silica, from 4% by weight of slip of colloidal silica, starch (9% of the aqueous mixture) and some % of deflocculant, the whole being mixed in an aqueous medium to obtain a slip.

The slip is moulded, machined and dried.

There remains, after 4 to 5 hours of baking at 700° C.:

93.5% $Al_2O_3$, 5.5% $SiO_2$, ≦1% others.

This cartridge is placed in the supporting cylinder whose inner diameter is substantially equal to the outer diameter of the cartridge, a sleeve presenting a flange is fitted in the cylinder and the candle obtained is disposed in a recess in the plate.

EXAMPLE 2

A cartridge is prepared from a slip of alumina fibers (1% by weight of slip of fibers), from colloidal silica (8%), starch (8%) and deflocculant (1%).

An excess thickness (8 mm) is moulded, with a tapered part at the end. Drying is effected.

Machining is effected to 5 mm.

The cartridge obtained is positioned in a sleeve inserted in the recess in the plate.

The results of filtration and clogging-up are given hereinafter:

1. Filtration

Tests were carried out on an incineration installation equipped with a natural gas burner delivering 100 to 120 $Nm^3/hr.$ of gas at high temperature varying from 600° to 1000° C. and with a filtering barrier adapted to receive 7 filtering candles. Two lines of dilution make it possible to monitor the temperature of the burner and to adjust the flowrate and temperature at the level of the barrier. Different taps were installed by injection and removal of aerosols.

The granulometric distribution of the aerosol test which is a dispersion of dioctylphthalate shows a mean median diameter of the droplets generated located around 0.6 $\mu m$ with a standard deviation of 1.7.

The aerosol was produced by a pneumatic generator with 6 spray nozzles supplied with air compressed at 2 bars of pressure.

There prevails in the enclosure a depression of −30 to −50 mm water column.

The efficiency of the filtering candle is determined by:

$$E(\%) = 100 \times \left(1 - \frac{C1}{C0}\right)$$

with

Co=concentration upstream of the candles (before filtration)

Cl=concentration downstream of the candles (after filtration).

2. Clogging-up

On the same installation, the flow of air was adjusted to real 58 $m^3$/hr., which corresponds to a speed of passage of 2.4 cm/s. at the level of passage of the cartridge.

Alumina dust was introduced at regular intervals; a total of 1500 g was dispersed at a rate of 40-60 g/hr., this representing a rate of dusting 25 to 35 times more rapid than in reality.

3. Results

| Cartridge | Pressure drop (water column) | Efficiency of filtration |
|---|---|---|
| obtained by wet process (Examples 1 and 2) | 17 mm | 99.1% |
| with asbestos fibers (prior art) | 22 mm | 99.0% |

The invention has been illustrated on incinerator gases, but it is clear that it is applicable to any type of gas laden with solid particles.

It is particularly applicable:

to hot gases (T >700°-750° C.);

to hot oxidizing gases laden with carbon;

to gases containing radio-active particles;

to the trapping of arsenic oxide $As_2O_3$ issuing from the combustion of arsine $AsH_3$, at 700° C.;

to the trapping of zinc chloride ($ZnCl_2$) at 900° C.

We claim:

1. A filtering cartridge for the filtration of gases, especially hot and/or radio-active and/or corrosive gases, comprising a substantially cylindrical, hollow body, closed at one of its ends and open on the other end, containing at least 50% by weight of alumina and/or zirconia and optionally being provided with means for support on a plate; said body being obtained by moulding in vacuo of a slip consisting essentially of fibers of alumina and/or zirconia having a diameter less than 20 $\mu m$ and length less than 25 mm, colloidal silica, at least one organic binding agent, at least one deflocculant, optionally, other fibers, and optionally, sodium, drying said slip and heat treating said dried slip at a sufficient temperature to volatilize said at least one organic binding agent and said at least one deflocculant.

2. Filtering cartridge according to claim 1, wherein the fibers of alumina and/or zirconia have a diameter less than 10 $\mu m$ and a length of between 10 and 15 mm.

3. Filtering cartridge according to one of claims 1 or 2, containing at least 85% by weight of alumina and/or of zirconia.

4. Filtering cartridge according to claim 3, wherein the fibers represent about 1% by weight of the slip.

5. Filtering cartridge according to claim 3, wherein the colloidal silica represents 3 to 12% by weight of the slip.

6. Filtering cartridge according to claim 3, wherein the slip contains sodium.

7. Filtering cartridge according to claim 6, wherein the sodium represents at the most 1% by weight of the slip.

8. Filtering cartridge according to claim 3, wherein the slip contains 5 to 10% by weight of said at least one organic binding agent.

9. Filtering cartridge according to claim 3, wherein the slip also contains other fibers laden with silica.

10. Filtering cartridge according to claim 1, wherein said heat treating takes place at a temperature of at least 700° C.

* * * * *